United States Patent
Drivon et al.

(10) Patent No.: US 10,323,666 B2
(45) Date of Patent: Jun. 18, 2019

(54) CLAMPING COLLAR HAVING A SPACER

(71) Applicant: ETABLISSEMENTS CAILLAU, Issy les Moulineaux (FR)

(72) Inventors: Stéphane Drivon, Romorantin (FR); Fabrice Prevot, Selles sur Cher (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 42 days.

(21) Appl. No.: 15/281,122

(22) Filed: Sep. 30, 2016

(65) Prior Publication Data
US 2017/0097024 A1   Apr. 6, 2017

(30) Foreign Application Priority Data
Oct. 1, 2015   (FR) ..................... 15 59350

(51) Int. Cl.
| F16B 2/08 | (2006.01) |
| F16L 21/06 | (2006.01) |
| F16L 33/04 | (2006.01) |

(52) U.S. Cl.
CPC .............. *F16B 2/08* (2013.01); *F16L 21/065* (2013.01); *F16L 33/04* (2013.01)

(58) Field of Classification Search
CPC ........... F16B 2/08; F16B 2/065; F16L 21/065; F16L 33/04; F01N 13/1805; F01N 13/1855; F01N 13/1872; Y10T 24/1441; Y10T 24/1412; Y10T 24/1486; Y10T 24/1457; Y10T 24/148; Y10T 24/44974
See application file for complete search history.

(56) References Cited

U.S. PATENT DOCUMENTS

| 978,398 | A | * | 12/1910 | Rischard | F16L 3/237 24/19 |
| 3,905,623 | A | * | 9/1975 | Cassel | E02B 11/005 285/382 |
| 4,056,273 | A | * | 11/1977 | Cassel | F16L 21/065 285/337 |
| 4,312,526 | A | * | 1/1982 | Cassel | F16L 21/065 285/419 |
| 4,364,588 | A | * | 12/1982 | Thompson | F16L 21/06 138/99 |
| 5,131,698 | A | * | 7/1992 | Calmettes | F01N 13/1805 24/19 |

(Continued)

FOREIGN PATENT DOCUMENTS

| DE | 2228060 A1 | 12/1973 |
| WO | 2011011773 A2 | 1/2011 |

*Primary Examiner* — Robert Sandy
*Assistant Examiner* — Rowland Do
(74) *Attorney, Agent, or Firm* — The Webb Law Firm

(57) ABSTRACT

The clamping collar has a belt (10) looped back onto itself and having two ends provided with lugs (12, 14) that are upstanding and that are suitable for being brought closer together for tightening the collar. The collar has a spacer (22) having a land (24) extending between the ends (10A, 10B) of the belt (10), and a web (26) having at least a first tab that is upstanding relative to said land, which web extends between the lugs. The spacer is formed by a strip that is folded between a first fold at the junction between the first tab and the land (24) and a second fold situated at a first end of the land, the land having a first double-walled portion between the first and second folds.

15 Claims, 3 Drawing Sheets

(56) References Cited

U.S. PATENT DOCUMENTS

| | | | | |
|---|---|---|---|---|
| 5,943,903 A * | 8/1999 | Tseng | B21D 3/00 | 269/287 |
| 6,062,610 A * | 5/2000 | Andersson | F16L 23/08 | 285/367 |
| 6,269,524 B1 * | 8/2001 | Cassel | F16L 21/065 | 24/279 |
| 6,519,815 B2 * | 2/2003 | Cassel | F16L 21/065 | 24/279 |
| 6,634,607 B2 * | 10/2003 | Vogel | F16L 21/065 | 24/279 |
| 6,796,004 B2 * | 9/2004 | Belisle | F16L 21/065 | 24/279 |
| 6,877,191 B2 * | 4/2005 | Logan | F16L 33/04 | 24/19 |
| 6,877,780 B2 * | 4/2005 | Potts | F16L 21/005 | 285/367 |
| 7,055,223 B2 | 6/2006 | Cassel et al. | | |
| 7,231,694 B2 * | 6/2007 | Ignaczak | F16L 21/065 | 24/279 |
| 7,770,937 B2 * | 8/2010 | Ignaczak | F16L 27/04 | 285/261 |
| 8,042,234 B2 * | 10/2011 | Rigollet | F16B 2/065 | 24/19 |
| 8,671,525 B2 * | 3/2014 | Prevot | F16L 21/065 | 24/19 |
| 2002/0014772 A1 * | 2/2002 | Amedure | F16L 21/005 | 285/373 |
| 2003/0015872 A1 * | 1/2003 | Potts | F16L 21/005 | 285/420 |
| 2004/0178632 A1 * | 9/2004 | Protas | F16L 21/065 | 285/419 |
| 2004/0216284 A1 | 11/2004 | Belisle et al. | | |
| 2005/0039306 A1 * | 2/2005 | Logan | F16L 33/04 | 24/19 |
| 2005/0189768 A1 * | 9/2005 | Avram | F16L 21/065 | 285/419 |
| 2006/0107498 A1 * | 5/2006 | Ignaczak | F16L 21/065 | 24/279 |
| 2006/0175837 A1 * | 8/2006 | Ignaczak | F16L 21/065 | 285/420 |
| 2008/0185841 A1 * | 8/2008 | Ignaczak | F16L 27/04 | 285/261 |
| 2009/0189392 A1 * | 7/2009 | Ignaczak | F16L 21/065 | 285/420 |
| 2012/0018999 A1 | 1/2012 | Geese et al. | | |
| 2017/0211732 A1 * | 7/2017 | Cowham | F16L 21/065 | |

* cited by examiner

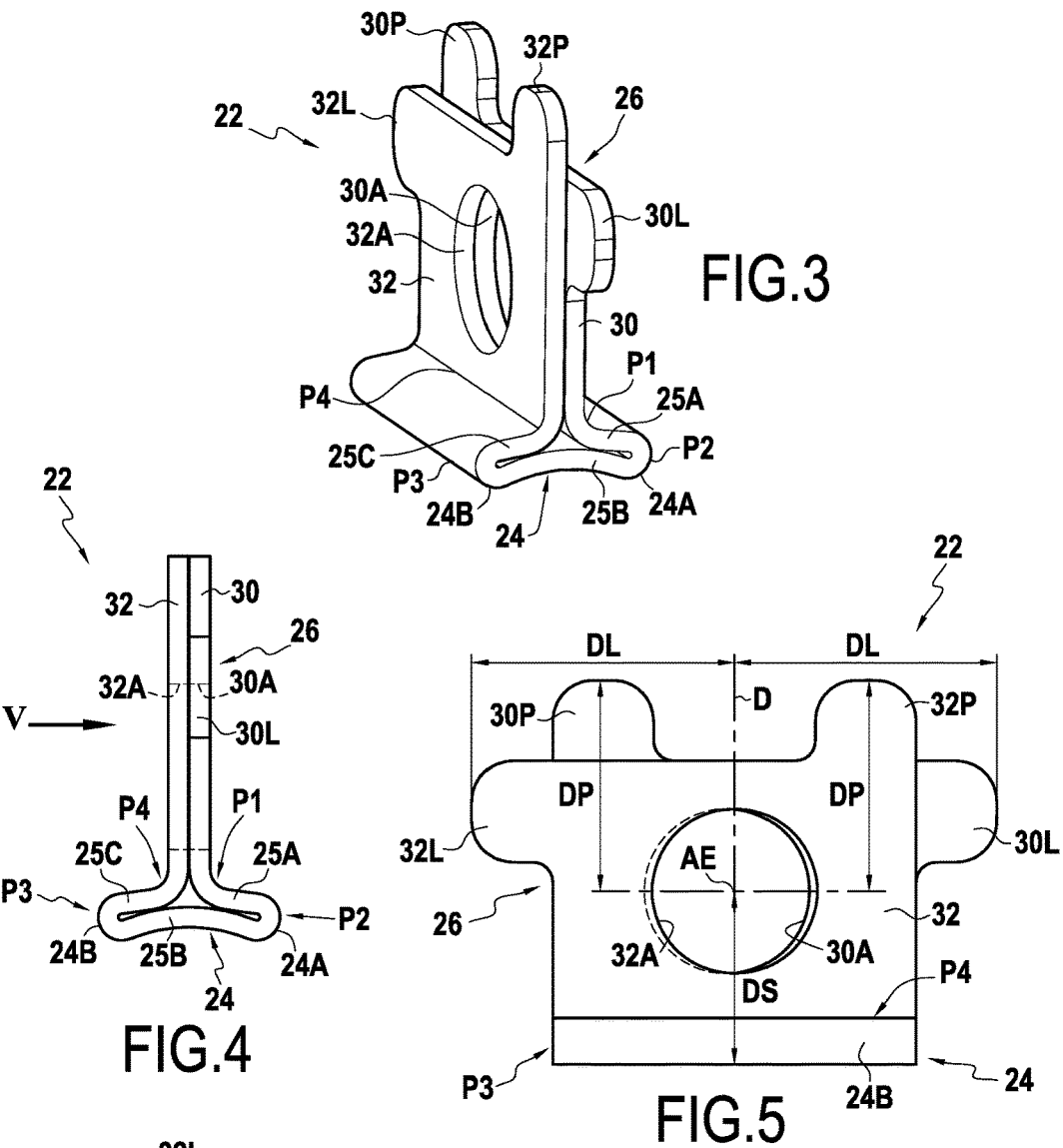
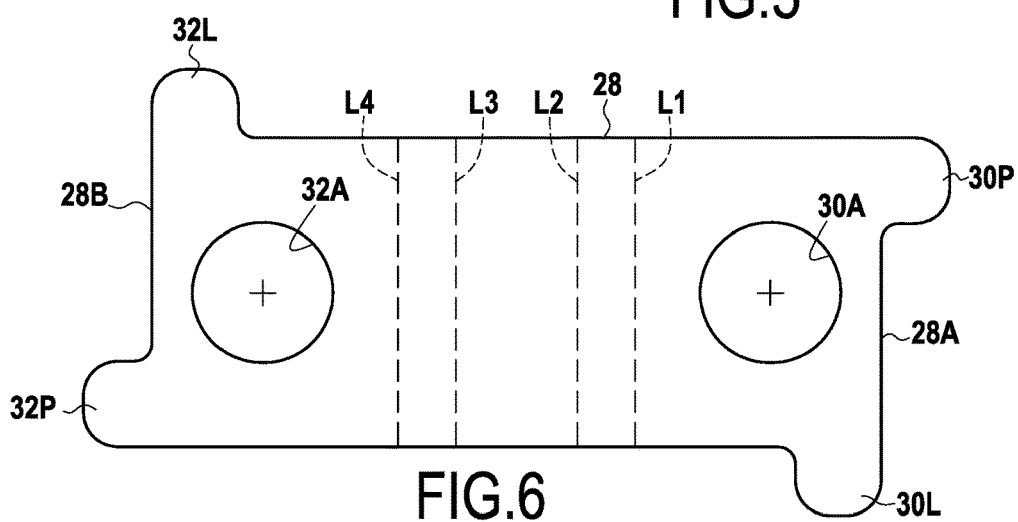

CLAMPING COLLAR HAVING A SPACER

BACKGROUND OF THE INVENTION

Field of the Invention

The present description relates to a clamping collar comprising a belt looped back onto itself around a substantially cylindrical outline and having two ends provided with lugs that are upstanding relative to said outline and that are suitable for being brought closer together for tightening the collar, the collar further comprising a spacer having a land extending substantially along said outline between the ends of the belt and a web comprising at least a first tab that is upstanding relative to said land, which web extends between the lugs.

The land of the spacer serves to bridge the gap between the ends of the belt, in order to ensure that the collar bears almost continuously around the article it is clamping, in particular when said article is a pipe clamped onto a tube through which a fluid flows, in order to ensure that the clamping is leaktight, for example.

Description of Related Art

A collar of this type is known from Document U.S. Pat. No. 7,055,223. In that collar, the lugs are provided with holes through which the shank of a tightening bolt passes, the head of which bolt is retained behind one of the two lugs, while a nut is retained behind the other lug. In radial section, i.e. perpendicularly to the axis of the cylindrical outline, the web of that spacer is V-shaped, the ends of the branches of the V-shape bearing against respective ones of the inside faces of the lug in a region remote from the axis. The land is made up of land portions, that are cut out from the branches of the V-shape. Insofar as those branches are also provided with holes through which the tightening shank can pass, those land portions are cut out in zones of the spacer that extend between said holes and the side ends of the spacer. Thus, the land portions are of small width, as measured parallel to the axis of the substantially cylindrical outline, said width being very significantly less than the total width of the spacer. Specifically, said land portions are thin cut-out strands, and their contact surface areas over which they are in contact with the article to be clamped by the collar are small. In theory, the land of the spacer serves to procure continuous contact with the article that is to be clamped, by bridging the gap situated between the ends of the belt. However, as indicated above, the land of that prior art is actually made up of a plurality of land portions in the form of thin strands having small surface areas of contact with said article.

As a result, the bearing continuity is not certain because a large fraction of the surface area of the article that is situated between the ends of the belt is not covered by the strands. In addition, said strands themselves lack strength and might deform under the effect of large tightening forces.

It is also known, e.g. from Document WO 2011/011773 that a spacer can be formed by a solid block disposed between the lugs. That spacer is relatively expensive to manufacture, and it has a relatively large weight and very high stiffness, so that its shape does not adapt to accommodate the reduction in the diameter of the belt that takes place during tightening.

SUMMARY OF THE INVENTION

In one aspect, an object of the invention is to remedy those drawbacks of the state of the art by proposing a collar provided with a spacer that is inexpensive to manufacture while also making it possible to achieve effective bridging of the gap situated between the ends of the belt.

Thus, the present description relates to a clamping collar comprising a belt looped back onto itself around a substantially cylindrical outline and having two ends provided with lugs that are upstanding relative to the outline and that are suitable for being brought closer together for tightening the collar, the collar further comprising a spacer having a land extending substantially along said outline between the ends of the belt and a web comprising at least a first tab that is upstanding relative to said land, which web extends between the lugs, in which collar the spacer is formed by a strip that is folded with a first fold situated at the junction between said first tab and the land, and a second fold situated at a first end of the land, the land having a first double-walled portion between said first and second folds.

Thus, the spacer is formed merely by a folded strip that can thus easily be given the desired size and that is inexpensive to manufacture. Depending on the diameter of the collar and on the width of the gap that is to be bridged between the ends of the belt, the strip can be cut to the desired size and the first and second folds can be made at the desired places. In addition, the land has a first double-walled portion, thereby locally increasing its stiffness while also allowing it to deform slightly during tightening, due to the fact that it is made from a strip and not from a solid block element. Finally, the land can thus have a continuous bearing surface for bearing against the article that is to be clamped so as to bridge effectively the gap between the ends of the belt without leaving a large area of the surface of said article not bearing against the land, unlike the land of Document U.S. Pat. No. 7,055,223.

Optionally, the web further has a second tab that extends against the first tab so that the web is a double-walled web.

In this situation, the thickness of the web is twice the thickness of the strip.

Optionally, the spacer has a third fold situated at the second end of the land, the land having a second double-walled portion between said third fold and the web.

In this situation, the land has two double-walled portions, the first double-walled portion extending on one side of the web, to the first end of the land, and the second double-walled portion extending on the other side of the web, to the second end of the land that is opposite from the first end. The land is thus reinforced over its entire length, as measured along the circumference of the belt and, and is reinforced in a manner that is balanced on either side of the web. These two double-walled portions, on either side of the web, make it possible to optimize the distribution of the reaction forces between the land of the spacer and the article clamped by means of the collar.

Optionally, the spacer has a fourth fold situated at the junction between the second tab and the land, the land having a second double-walled portion between said fourth fold and the second end of the land.

As explained below, the fourth fold may be present with the first and second folds only, or else with the first, second, and third folds. In any event, the existence of said fourth fold also makes it possible to provide the land with a second double-walled portion, on the side of the web opposite from the side on which the first double-walled portion is situated.

Optionally, the web has at least one side projection and/or at least one projection in alignment with said at least a first tab.

In particular, as explained below, such a projection acts as a positioning key and facilitates manipulating the spacer.

Optionally, the lugs are provided with holes, and the collar has a tightening shank passing through said holes.

Optionally, the web is provided with a hole through which the tightening shank also passes.

Optionally, the collar includes at least one washer retained on the tightening shank on one side of the web.

Such a washer makes it possible to pre-position the spacer on the tightening shank while thereby facilitating positioning it correctly relative to the article that is to be clamped by the collar.

Optionally, each of the two tabs of the web is provided with a hole, these holes having axes that are mutually offset.

A slight offset between the axes also makes it possible to pre-position the spacer on the tightening shank. If the dimensions of the holes are just sufficient to enable the shank of the screw to pass through each hole, this offsetting of the axes naturally causes the shank of the bolt to rub against the edges of the holes, thereby holding the spacer on the shank by friction.

Optionally, the belt and the spacer are made of metal.

In particular, the metal used is stainless steel. The same metal may be used for the belt of the collar and for the strip from which the spacer is formed.

BRIEF DESCRIPTION OF THE DRAWINGS

The invention can be well understood and its advantages appear more clearly on reading the following detailed description of embodiments that are shown by way of non-limiting example. The description refers to the accompanying drawings, in which:

FIG. 3 is a perspective view of the spacer of the collar shown in FIGS. 1 and 2;

FIG. 4 is an end-on view of the FIG. 3 spacer;

FIG. 5 is a view seen looking along arrow V of FIG. 4;

FIG. 6 is a view as laid out flat of the strip from which the spacer is formed.

DETAILED DESCRIPTION OF THE INVENTION

Figure 1:
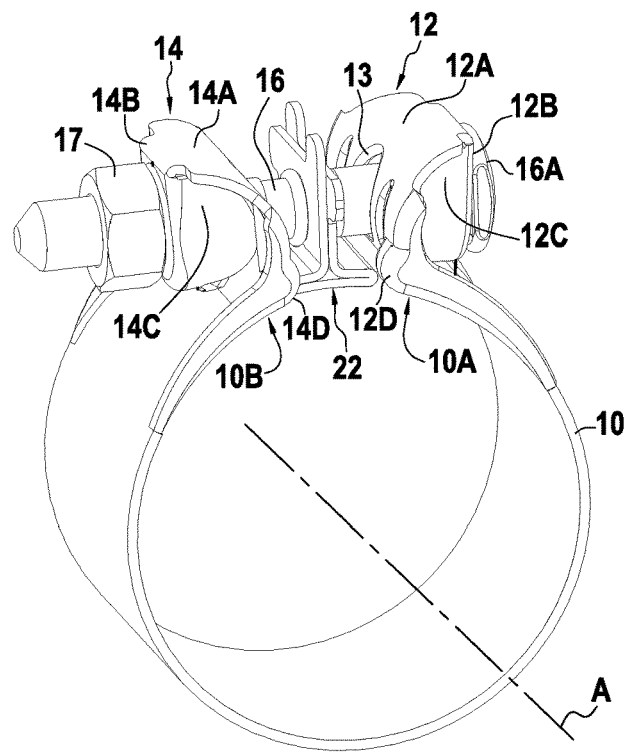
FIG. 1 is a perspective view of an embodiment of a clamping collar, in the non-tightened state.
Figure 2:
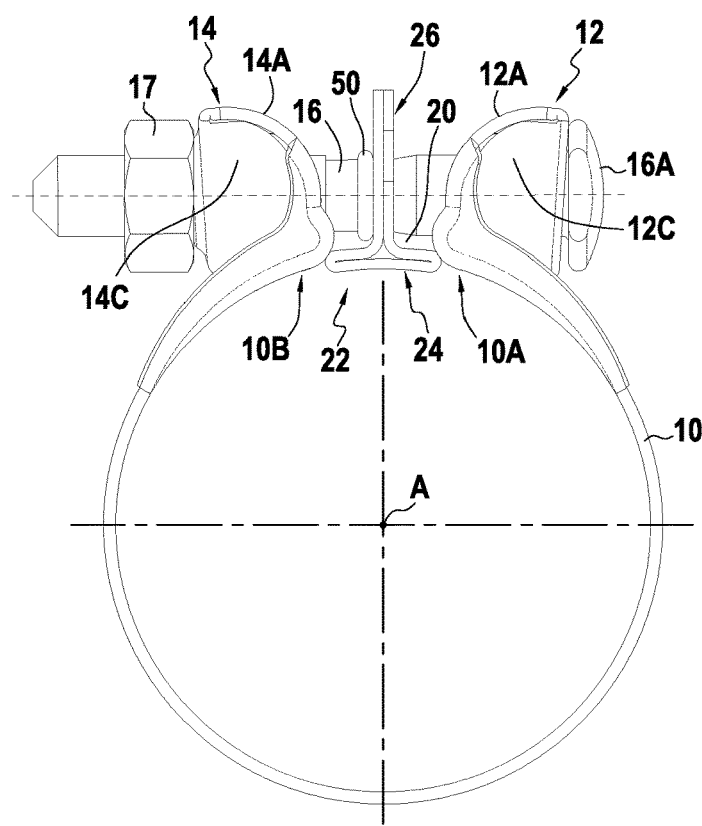
FIG. 2 is an end-on view of the FIG. 1 collar.

The clamping collar shown in FIGS. 1 and 2 comprises a belt 10 looped back on itself around a substantially cylindrical outline of axis A. The ends 10A and 10B of said belt are provided with lugs, respectively 12 and 14, that are upstanding relative to the cylindrical outline and that are suitable for being brought closer together to tighten the collar. In a manner known per se, these lugs are provided with holes (for example, the hole 13 in the lug 12 is visible in FIG. 1) for passing a tightening shank 16 that co-operates with tightening members that bear against the lugs in order to tighten the collar. In this example, the tightening shank is the shank of a bolt, of which the head 16A, which forms a first tightening member, bears behind the lug 12, and a nut 17 screwed onto the shank 16 forms the second tightening member bearing behind the lug 14. Tightening the nut causes the lugs to be brought closer together, and thus causes the collar to be tightened. Generally, the belt 10 and its lugs 12 and 14 are of the type described in Documents WO 2006/109001, WO 2006/109002, and WO 2010/004233.

The lugs 12 and 14 face each other on either side of a tightening gap 20 delimited between the ends 10A and 10B of the belt. In this example, each of the lugs has a respective front portion 12A, 14A that, for each lug, faces towards the other lug, i.e. towards the tightening gap 20. Each of the lugs also has a respective bearing portion 12B, 14B, with which a respective tightening member 16A, 17 co-operates. The bearing portions are situated behind the lugs, opposite from the above-mentioned front portions 12A and 14A. In this example, the lugs 12 and 14 are lugs having extensions. This means that, for each lug, the bearing portion is formed in an extension to the lug that is folded over towards the back of the lug in question away from the other lug in the pair. Naturally, the front portions 12A and 14A, and the rear portions 12B and 14B are provided with holes for passing the tightening shank 16. The extensions to the lugs in which the bearing portions 12B and 14B are formed also have respective flanges 12C, 14C that co-operate with the back faces of the respective front portions 12A, 14A to form spacers between the front portions and the tightening portions.

The collar shown in FIGS. 1 and 2 includes a spacer 22 that is disposed between the front portions 12A and 14A of the lugs and serves to bridge the above-mentioned gap 20. The spacer 22 has a land 24 that extends substantially along the cylindrical outline between the ends 10A and 10B of the belt, and a web 26 that is upstanding relative to the land and that thus extends between the lugs 12 and 14. Thus, as seen end-on, i.e. looking along the axis A, or as seen in section perpendicular to said axis, the spacer is in the shape of an upside-down T, the web forming the upright of the T, while the land forms the crosspiece of the T. The inside face of the land 24 may be slightly concave so as to take on the shape of the above-mentioned outline. Naturally, this concave shape depends on the diameter of the belt and on the length of the land, as measured along the inside circumference of the belt.

With reference to FIGS. 3 to 6, it can be seen that the spacer 22 is formed by a strip 28 that is folded at various different places, along fold lines that are perpendicular to its length.

The web 26 is made up of a first tab 30 and of a second tab 32 that are folded over one against the other and that are upstanding relative to the land 24 in such a manner as to extend substantially radially when the spacer is in place in the collar as shown in FIGS. 1 and 2. Naturally, this web is provided with a hole for passing the tightening shank 16, and, as can be seen, in this example, two holes, respectively 30A and 30B, are formed in respective ones of the tabs 30 and 32. The tabs are pressed one against the other so that their inside surfaces, as turned to face each other, are in contact with each other.

In the embodiment shown, it can be seen that the spacer has a first fold P1 situated at the junction between the first tab 30 and the land 24, a second fold P2 situated at the first end 24A of the land, a third fold P3 situated at the second end 24B of the land, and a fourth fold P4 situated at the junction between the second tab 32 and the land.

The land thus has an inside wall 25B that faces towards the axis A and that forms a return segment starting from fold P2 and extending to fold P3. The land thus has a first double-walled portion in which an outside wall 25A that extends between folds P1 and P2 covers the inside wall 25B on the outside of the land, i.e. its side that is situated further away from the axis A. The land also has a second double-walled portion formed by a second outside wall 25C that extends, between the folds P3 and P4, on the outside relative to the inside wall 25B. In addition the web 26 is double-walled due to the tabs 30 and 32 extending one against the other.

In FIG. 6, the strip 28 from which the spacer is formed is shown as laid out flat, and the holes 30A and 32A in the tabs 30 and 32 can be seen, as can the lines L1, L2, L3, and L4 along which the folds P1, P2, P3, and P4 are formed respectively.

The web 26 has at least one side projection and/or at least one projection in alignment with the tab 30 or 32. In this example, each of the tabs 30 and 32 has a side projection, respectively 30L and 32L that projects on a respective side of the spacer, parallel to the axis A. In this example, these projections are situated on respective ones of two opposite sides of the spacer. When the spacer is in place in the collar, these projections extend beyond the sides of the spacer parallel to the axis A in respective opposite directions.

Similarly, each of the tabs 30 and 32 has a respective extension 30P, 32P, each of which is formed at a respective end of the strip 28. When the spacer is in place in the collar, these extensions project substantially radially.

These projections and these extensions act as positioning keys. It can be seen in FIG. 5 that the distances DL between the free edges of the side projections 30L and 32L and the axis AE of the hole (30A, 32A) in the web 26 that is provided for passing the tightening shank (these distances being measured relative to a diameter D of said hole that is perpendicular to the inside surface of the land 24) are greater than the distance DS between the inside face of the land 24 and the axis AE. Thus, if the spacer is incorrectly positioned on the shank 16, so that the land extends substantially perpendicularly to the axis A, one of the side projections 30L or 32L projects inwardly beyond the cylindrical outline formed by the belt 10 and thus prevents the article that is to be clamped from being inserted into said belt. The operator then realizes immediately that the positioning is incorrect and corrects the positioning of the spacer. Similarly, the distances DP between the free edges of the extensions 30P and 32P and the axis AE (these distances being measured perpendicularly to a diameter D' of the hole in the web that is parallel to the inside surface of the land or that is parallel to a tangent to the bottom of said inside surface) are also greater than the distance DS of the inside surface of the land relative to the axis AE. Thus, if the spacer is positioned incorrectly, so that the land 24 is remote from the axis A, the extensions 30P and 32P then project into the inside circumference of the belt, and they also prevent the article that is to be clamped from being inserted, thereby enabling the operator to be aware of the error and to correct it.

In the above-described embodiment, the free ends 28A and 28B of the strip are situated at the ends of the tabs 30 and 32 that are remote from the land 24.

Other embodiments of the spacer are described below with reference to FIGS. 7 to 9.

Figure 7:
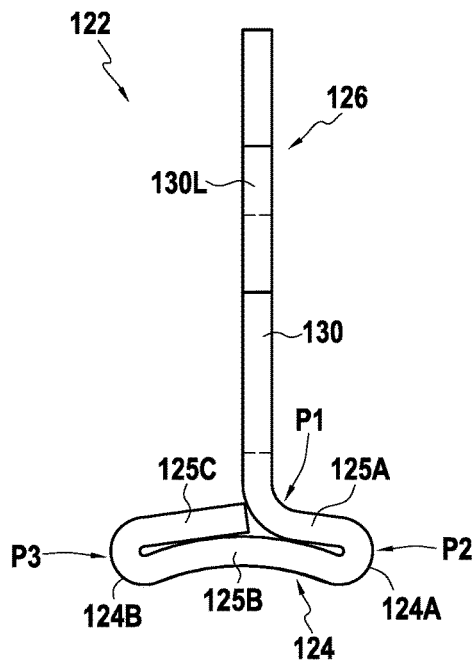
FIGS. 7, 8, and 9 are end-on views of variants of a spacer.

In FIG. 7, the spacer 122 has a single tab 130 and a land 124 having two double-walled portions. This spacer has a first fold P1 between the tab 130 and the land 24, a second fold P2 situated at the first end 124A of the land, and a third fold P3 situated at the second end 124B of the land. The inside wall 125B of the land is thus covered, between the tab 130 and the fold P2, by a first outside wall 125A, and it is also covered, between the fold P3 and the web 126 by a second outside wall 125C, the free end of which is situated in the vicinity of the tab 130. Thus, in this example, the web is not double-walled, but the land is double-walled. In this example, a first free end of the strip is situated at the end of the tab 130 that is remote from the land, and the second free end of the strip is situated at the junction between the inside wall 125B and the web 130. In a variant, the land may terminate at its end 124B, without having the outside wall 125C.

Figure 8:
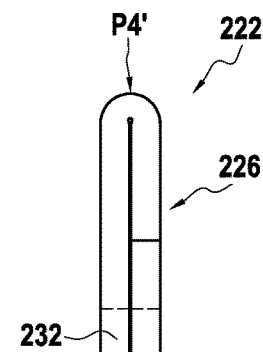

In FIG. 8, both the land 224 and the web 226 are double-walled. More precisely, the web 226 has a first tab 230, a first fold P1 at the junction between said first tab and the land 224, a second fold P2 at the first end 224A of the land, a third fold P3 at the second end 224B of the land that is opposite from the end 224A, and a fourth fold P4' at the top of the tab 230, i.e. at the junction between the first tab 230 and the second tab 232 that makes the web double-walled by being brought towards the land from said fourth fold P4'. Thus the inside wall 225B of the land is covered by outside walls, respectively the outside wall 225A between folds P1 and P2 and the outside wall 225C between fold P3 and the web. In this embodiment, free ends of the strip from which the spacer is formed are situated in the vicinity of the junction between the second tab 232 and the inside wall 225B.

Figure 9:
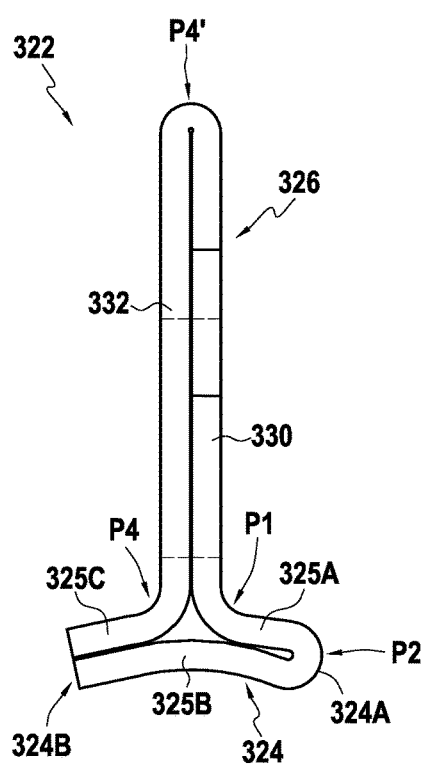

In FIG. 9, the spacer 322 also has a land 324 and a web 326 that are double-walled. This spacer has a first tab 330 forming a portion of the web 326, a first fold P1 situated at the junction between the tab 330 and the land 324, a second fold P2 situated at the first end 324A of the land, a fold P4' situated at the top of the web 326, at the junction between the tabs 330 and 332, and another fold P4 situated at the junction between the tab 332 and the land 324. This other fold P4 acts as the above-mentioned fourth fold. Thus, the inside wall 325B of the land is covered by a first outside wall 325 between the folds P1 and P2, and by a second outside wall 325C between the fold P4 and the second end 324B of the land. In this example, the free ends of the strip from which the spacer is folded are formed at said second end 324B.

Naturally, in the embodiments shown in FIGS. 7 to 9, the web may be provided with a hole for passing the tightening shank, and may be provided with the above-mentioned side projection(s) and/or with the above-mentioned extensions. For example, a side projection 130L is indicated in FIG. 7.

With reference to FIGS. 1 and 2, it can be seen that the collar has a washer 50 retained on the tightening shank 16 on one side of the web 26 of the spacer. For example, this washer is a washer made of elastomer or of rubber, e.g. a ring, engaged as a friction fit around the tightening shank 16. This washer is thus disposed between one of the lugs, in this example the lug 14, and the web of the spacer. It makes it possible to maintain the web of the spacer some distance away from said lug so as to ensure that the spacer is centered correctly relative to the gap 20 that is to be bridged.

The two holes 30A and 32A in the tabs 30 and 32 can be aligned when said tabs are folded over one against the other to form the web 26. However, as can be seen in FIG. 5, it is possible to choose to offset the holes 30A and 32A in the respective tabs 30 and 32 of the web so that their axes do not coincide with each other, i.e. while having the same sizes, the holes need not be exactly aligned. For example the offset between the axes of the two holes may be about a few tenths of a millimeter. For example, this offset may be approximately in the range $\frac{1}{100}^{th}$ of the diameter of the holes 30A and 32A to $\frac{1}{5}^{th}$ of said diameter, and preferably approximately in the range $\frac{1}{20}^{th}$ to $\frac{1}{10}^{th}$ of said diameter. In this situation, if the holes are of sizes matching the diameter of the shank of the bolt, this offsetting of their axes causes the edges of the holes to rub against the bolt and thus naturally retain it in the desired position by friction, without preventing tightening, in particular since the two tabs 30 and 32 of the spacer can slide to a small extent one against the other.

The land of the spacer may be of greater or lesser width depending on the distance between the ends 10A and 10B of the lugs when the collar is in the tightened state. In addition, the inside face of the belt may be raised a little in the region of said ends 10A and 10B relative to the cylindrical outline formed by the belt, in order to receive the ends of the land. In this example, it can be seen in FIG. 1 that the belt 10 is slightly wider than the land 24, with the width being measured parallel to the axis A, and that the side edges of the ends 10A and 10B that are situated at the bases of the lugs 12 and 14 have protuberance portions, respectively 12D and 14D, between which the land of the spacer comes to be received when the collar is in the tightened state. These protuberance portions are, for example, of the type described in Document WO 2006/109001.

The invention claimed is:

1. A clamping collar comprising a belt looped back onto itself around a substantially cylindrical outline and having two ends provided with lugs that are upstanding relative to said outline and that are suitable for being brought closer together for tightening the collar, the collar further comprising a spacer having a land extending substantially along said outline between the ends of the belt and a web comprising at least a first tab that is upstanding relative to said land, which web extends between the lugs, the spacer being formed by a strip that is folded with a first fold situated at a junction between said first tab and the land, and a second fold situated at a first end of the land, the land having a first double-walled portion between said first and second folds, the first tab of the web having at least one projection.

2. A collar as claimed in claim 1, wherein the web has a second tab that extends against the first tab so that the web is a double-walled web.

3. A collar as claimed in claim 2, wherein the spacer has a third fold situated at a second end of the land, the land having a second double-walled portion between said third fold and the web.

4. A collar as claimed in claim 3, wherein the spacer has a fourth fold situated at a junction between the second tab and the land, the land having a second double-walled portion between said fourth fold and the second end of the land.

5. A collar as claimed in claim 2, wherein the spacer has a further fold situated at a junction between the second tab and the land, the land having a second double-walled portion between said further fold and the second end of the land.

6. A collar as claimed in claim 2, wherein that each of the first and second tabs of the web is provided with a hole, these holes having axes that are mutually offset.

7. A collar as claimed in claim 1, wherein the at least one projection is a projection.

8. A collar as claimed in claim 7, wherein the side projection is parallel to an axis of the cylindrical outline.

9. A collar as claimed in claim 1, wherein the at least one projection is in alignment with said at least said first tab.

10. A collar as claimed in claim 1, wherein the lugs are provided with holes and the collar has a tightening shank passing through said holes.

11. A collar as claimed in claim 10, wherein the web is provided with a hole through which the tightening shank also passes.

12. A collar as claimed in claim 11, including at least one washer retained on the tightening shank on one side of the web.

13. A collar as claimed in claim 11, wherein a distance between a free edge of said at least one projection and a center of said hole in said web is greater than a distance between said center of said hole in said web and an inside surface of the land.

14. A collar as claimed in claim 1, wherein the belt and the spacer are made of metal.

15. A collar as claimed in claim 1, wherein the at least one projection acts as a positioning key.

* * * * *